US007993579B2

(12) United States Patent
Williams et al.

(10) Patent No.: US 7,993,579 B2
(45) Date of Patent: Aug. 9, 2011

(54) MAGAZINE LOADING OF SOLID PRODUCTS AND METHOD OF DISPENSING SAME

(75) Inventors: Kristine J. Williams, Oak Ridge, NC (US); Thomas P. Berg, Greensboro, NC (US); Karen O. Rigley, Greensboro, NC (US)

(73) Assignee: Ecolab USA Inc., St. Paul, MN (US)

( * ) Notice: Subject to any disclaimer, the term of this patent is extended or adjusted under 35 U.S.C. 154(b) by 1042 days.

(21) Appl. No.: 11/487,138

(22) Filed: Jul. 14, 2006

(65) Prior Publication Data

US 2008/0011774 A1 Jan. 17, 2008

(51) Int. Cl.
| | |
|---|---|
| B01D 11/02 | (2006.01) |
| B01D 15/00 | (2006.01) |
| B08B 7/00 | (2006.01) |
| B08B 9/00 | (2006.01) |
| E04H 3/16 | (2006.01) |
| C02F 1/76 | (2006.01) |
| B67B 7/00 | (2006.01) |
| B67D 5/56 | (2006.01) |

(52) U.S. Cl. .............. 422/1; 422/28; 422/261; 422/263; 422/264; 422/267; 422/275; 134/6; 134/22.1; 134/93; 134/94.1; 134/95.3; 210/169; 210/198.1; 210/754; 210/756; 222/1; 222/129

(58) Field of Classification Search .............. 422/1, 28, 422/261, 263–264, 267, 275; 134/6, 22.1, 134/93, 94.1, 95.3; 210/169, 198.1, 754, 210/756; 222/1, 129

See application file for complete search history.

(56) References Cited

U.S. PATENT DOCUMENTS

| 3,107,156 A * | 10/1963 | Fredericks .................... 422/264 |
| 4,426,362 A | 1/1984 | Copeland et al. |
| 4,569,781 A | 2/1986 | Fernholz et al. |
| 4,687,121 A | 8/1987 | Copeland |

(Continued)

FOREIGN PATENT DOCUMENTS

EP 0 242 966 A2 10/1987

(Continued)

OTHER PUBLICATIONS

"Quarry Tile Floors", Quick Service Restaurants, http://www.ecolab.com/solutionGuide4, 1 pg. (© Ecolab Inc. 2006).

*Primary Examiner* — Jill Warden
*Assistant Examiner* — Monzer R Chorbaji
(74) *Attorney, Agent, or Firm* — IPLM Group, P.A.

(57) ABSTRACT

A method of dispensing a first solid product and a second solid product with a solid product dispenser includes placing the first solid product in a product housing of the dispenser and placing the second solid product in the product housing on top of the first solid product, the first and second solid products being different products. A portion of the first solid product is dispensed during each cycle of the dispenser until the first solid product has been partially depleted to a size small enough to allow the second solid product to also be dispensed, then a portion of the first solid product and a portion of the second solid product are dispensed during each cycle of the dispenser until the first solid product has been completely depleted, and then a portion of the second solid product is dispensed during each cycle of the dispenser.

12 Claims, 4 Drawing Sheets

U.S. PATENT DOCUMENTS

| | | |
|---|---|---|
| 4,690,305 A | 9/1987 | Copeland |
| 4,826,661 A | 5/1989 | Copeland et al. |
| 5,385,044 A | 1/1995 | Thomas et al. |
| 5,474,698 A | 12/1995 | Rolando et al. |
| 5,494,644 A | 2/1996 | Thomas et al. |
| 5,505,915 A | 4/1996 | Copeland et al. |
| 5,607,651 A | 3/1997 | Thomas et al. |
| D381,141 S | 7/1997 | Balz |
| 5,707,590 A | 1/1998 | Thomas et al. |
| 5,716,260 A | 2/1998 | Griffin et al. |
| 5,743,287 A | 4/1998 | Rauchwerger |
| 5,797,986 A | 8/1998 | Rolando et al. |
| 5,928,608 A * | 7/1999 | Levesque et al. ............... 422/37 |
| 6,138,703 A | 10/2000 | Ferguson |
| 6,432,906 B1 | 8/2002 | Carlson et al. |
| 6,589,443 B1 | 7/2003 | Olson |
| 2005/0197276 A1 | 9/2005 | Rigley et al. |

FOREIGN PATENT DOCUMENTS

| | | |
|---|---|---|
| EP | 0 875 558 A | 11/1998 |
| WO | WO/2006/037354 A | 4/2006 |

* cited by examiner

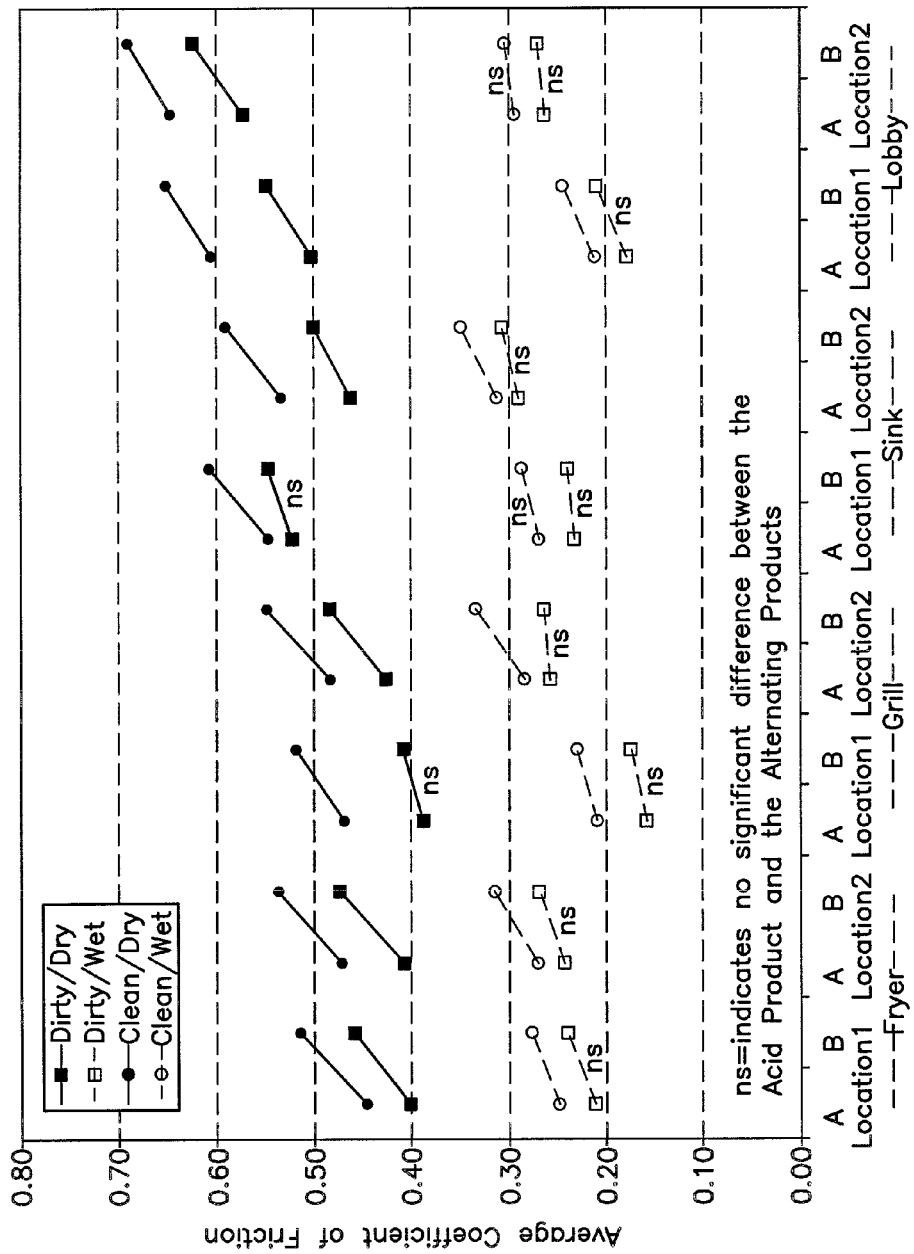

MAGAZINE LOADING OF SOLID PRODUCTS AND METHOD OF DISPENSING SAME

FIELD OF THE INVENTION

The present invention relates to magazine loading of solid products by alternating two different solid products within a product housing of a solid product dispenser and a method of dispensing the magazine loaded solid products.

BACKGROUND OF THE INVENTION

Extruded clay or ceramic tile, sometimes called quarry tile, is commonly used in institutional and non-institutional kitchens such as restaurants because it is relatively inexpensive, durable, and has relatively low porosity. Quarry tile is made from natural clays with the composition being approximately 50% hard particles (silicon) and the other 50% soft particles (clay components). When the clay tile is fired, it develops a pervious glaze-like coating which encapsulates pores under the surface. Because of the pervious nature of the surface, these pores collect and entrap various soils that are extremely difficult to clean thoroughly.

During the manufacturing process of quarry tile, a natural surface roughness may be created consisting of hard, microscopic peaks of silica and inert clays. The surface texture or roughness coupled with the surface porosity provides the tile with an optimum static coefficient of friction (traction). New quarry tile tends to be slip-resistant, and some tiles feature anti-slip properties such as added grit, grid patterns, or a rougher surface texture. However, even the anti-slip tile becomes worn and soiled over time and becomes slippery and potentially dangerous. After a short time, the quarry tile receives abrasion and surface wear due to foot traffic, soils, and daily surface cleaning. The microscopic peaks may become polished or worn down, leading to flat surface areas. These worn areas result in a lower static coefficient of friction and create a potentially slippery floor surface. In addition, frying, grilling, and sautéing create airborne grease, which causes a potentially hazardous film to develop on the tile. Despite daily cleaning, there if often a buildup of soil and grease over time, and a quarry tile floor can become saturated with grease and continue to stay slippery despite routine cleaning.

Hard surface cleaners useful in institutional and non-institutional environments may take any number of forms. An example of such a cleaner is an aqueous cleaner formulation that can be neutral, acidic, or alkaline in pH when diluted to create a use solution. Aqueous neutral, acidic, or alkaline cleaners in use solutions are typically formulated using a major proportion of an aqueous diluent and a minor proportion of the cleaner. Cleaners having a neutral pH or an alkaline pH effectively remove fresher grease soils, and cleaners having an acidic pH effectively remove polymerized grease soils. An example of an acidic cleaner formulation useful in cleaning soils comprising food residue is disclosed in U.S. Pat. No. 6,432,906, which is incorporated by reference herein. An example of a basic (alkaline) cleaner formulation useful in cleaning soils comprising food residue is disclosed in U.S. Pat. No. 5,474,698, which is incorporated by reference herein.

U.S. Pat. No. 5,797,986, which is incorporated by reference herein, discloses a method of cleaning a floor using a first cleaner with a pH departing from neutral followed by a second cleaner with a complementary pH. In one aspect, the first cleaner is an acidic cleaner and the second cleaner is a basic cleaner. In another aspect, the first cleaner is a basic cleaner and the second cleaner is an acidic cleaner. This method provides optimal cleaning.

The cleanliness of hard surfaces such as floors is characteristic of a substantially improved coefficient of friction (hereinafter "COF"). A COF greater than about 0.4 connotes a non-slip surface of substantially improves safety when compared to slippery soiled surfaces. By increasing the coefficient of friction (traction) and reducing floor slipperiness, dangerous accidents can be reduced.

SUMMARY OF THE INVENTION

One aspect of the present invention provides a method of dispensing a first solid product and a second solid product with a solid product dispenser. The first solid product and the second solid product are positioned in a product housing of the solid product dispenser. The first solid product and the second solid product are different products. The first solid product is placed in the product housing of the solid product dispenser, and the second solid product is placed in the product housing of the solid product dispenser on top of the first solid product. A portion of the first solid product is dispensed during each cycle of the solid product dispenser until the first solid product has been partially depleted to a size small enough to allow the second solid product to also be dispensed. A portion of the first solid product and a portion of the second solid product are dispensed during each cycle of the solid product dispenser until the first solid product has been completely depleted. A portion of the second solid product is dispensed during each cycle of the solid product dispenser.

Another aspect of the present invention provides a method of dispensing a first solid product and a second solid product with a solid product dispenser. The first solid product and the second solid product are positioned in a product housing of the solid product dispenser. The first solid product and the second solid product are different products. The first solid product is placed in the product housing of the solid product dispenser. A portion of the first solid product is dispensed during each cycle of the solid product dispenser until the first solid product has been partially depleted to a size small enough to allow the second solid product to be positioned in the product housing on top of the first solid product. The second solid product is placed in the product housing of the solid product dispenser on top of the first solid product. A portion of the first solid product is dispensed during each cycle of the solid product dispenser until the first solid product has been partially depleted to a size small enough to allow the second solid product to also be dispensed. A portion of the first solid product and a portion of the second solid product are dispensed during each cycle of the solid product dispenser until the first solid product has been completely depleted. A portion of the second solid product is dispensed during each cycle of the solid product dispenser.

Another aspect of the present invention provides a method of dispensing a first solid product and a second solid product with a solid product dispenser. The first solid product and the second solid product are positioned in a product housing of the solid product dispenser. The first solid product and the second solid product are different products. The first solid product is placed in the product housing, and a bottom portion of the first solid product is contacted with a diluent to dissolve a portion of the first solid product to create a first use solution. A portion of the first solid product is dispensed during each cycle of the solid product dispenser until the first solid product has been partially depleted to a size small enough to allow the second solid product to be positioned within the product housing on top of the first solid product. The second solid product is placed in the product housing of the solid product dispenser on top of the first solid product, and a bottom portion of the first solid product is contacted with the diluent to dissolve a portion of the first solid product to create the first use solution. A portion of the first solid product is dispensed until the first solid product has been partially depleted to a size small enough to allow the second solid product to also be dispensed. A bottom portion of the first solid product and a bottom portion of the second solid product are contacted with the diluent to dissolve a portion of the first solid product and a portion of the second solid product to create a second use solution. A portion of the first solid product and a portion of the second solid product are dispensed until the first solid product has been completely depleted. A bottom portion of the second solid product is contacted with the diluent to dissolve a portion of the second solid product to create a third use solution.

Another aspect of the present invention provides a method of dispensing an acidic solid product and an alkaline solid product with a solid product dispenser. The acidic solid product and the alkaline solid product are positioned in a product housing of the solid product dispenser. The acidic solid product is placed in the product housing, and a bottom portion of the acidic solid product is contacted with a diluent to dissolve a portion of the acidic solid product to create an acidic use solution. A portion of the acidic solid product is dispensed during each cycle of the solid product dispenser until the acidic solid product has been partially depleted to a size small enough to allow the alkaline solid product to be positioned within the product housing on top of the acidic solid product. The alkaline solid product is placed in the product housing of the solid product dispenser on top of the acidic solid product. A portion of the acidic solid product is dispensed until the acidic solid product has been partially depleted to a size small enough to allow the alkaline solid product to also be dispensed. A bottom portion of the acidic solid product and a bottom portion of the alkaline solid product are contacted with the diluent to dissolve a portion of the acidic solid product and a portion of the alkaline solid product to create a neutral use solution. A portion of the acidic solid product and a portion of the alkaline solid product are dispensed until the acidic solid product has been completely depleted. A bottom portion of the alkaline solid product is contacted with the diluent to dissolve a portion of the alkaline solid product to create an alkaline use solution.

BRIEF DESCRIPTION OF THE DRAWINGS

FIG. 8 is a graph showing average coefficient of friction readings with acid product compared to alternating acid and alkaline products.

DETAILED DESCRIPTION OF A PREFERRED EMBODIMENT

The present invention relates to magazine loading of solid products by alternating two different solid products within a product housing of a solid product dispenser and a method of dispensing the magazine loaded solid products.

The term "alternating" as used herein includes arranging at least two different solid products in a desired order including, but not limited to, every other, every second, every third, and the like. The purpose for alternating at least two different solid products is to cycle the use solutions created therefrom through a desired pH range to enhance the overall effectiveness of the system. The exact manner in which the solid products are alternated may vary depending upon the type of cycling desired.

Any suitable solid product dispenser may be used. Examples of suitable solid product dispensers are disclosed in U.S. Pat. Nos. 4,426,362; 4,687,121; 4,690,305; and 4,826,661 and U.S. Provisional Patent Application No. 60/795,340. Because such solid product dispensers are well known in the art, only a general description of how such a solid product dispenser operates is discussed.

Figure 1:
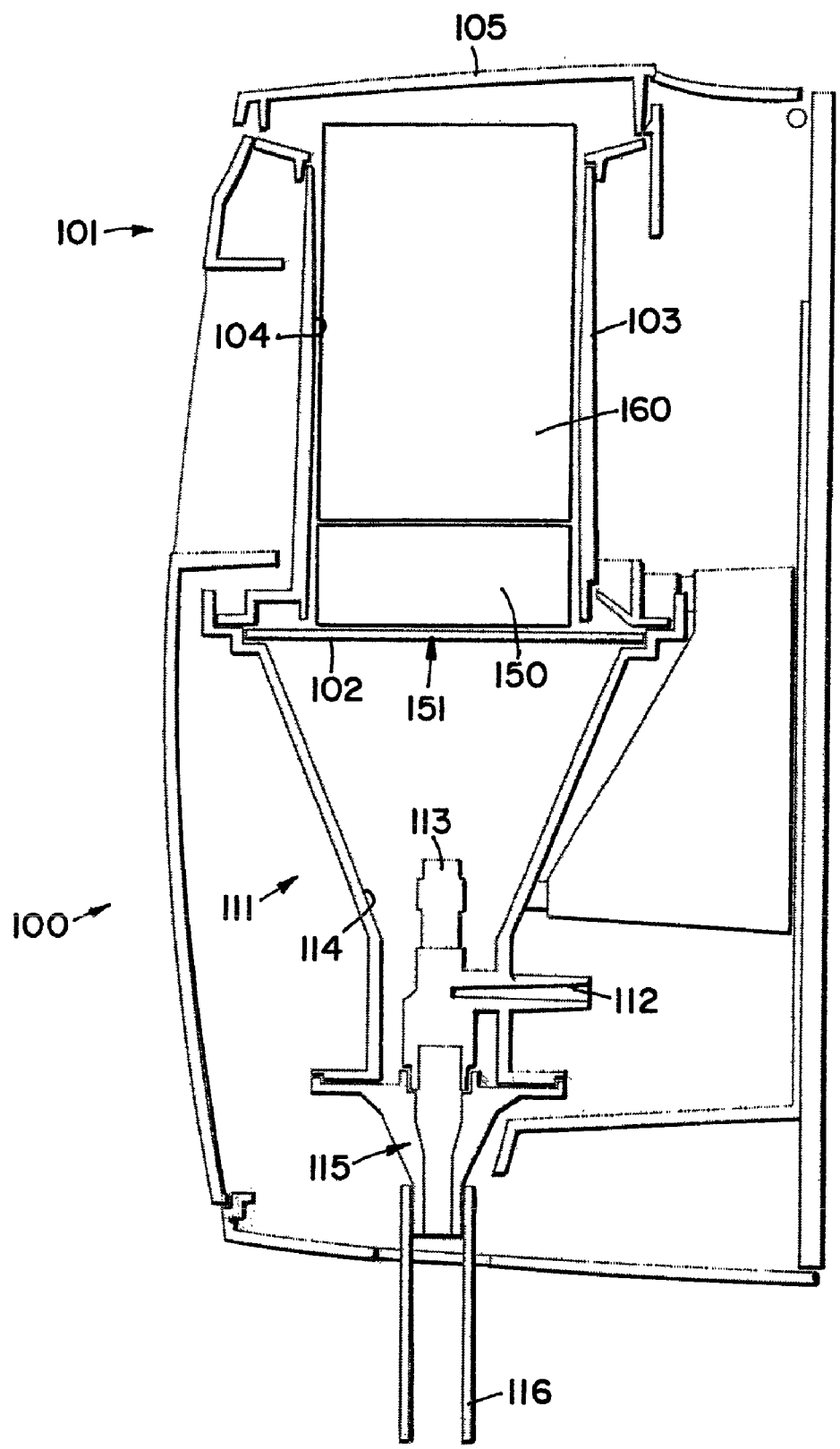
FIG. 1 is a cross-section view of a solid product dispenser containing a first solid product and a second solid product within a product housing of the solid product dispenser.

FIG. 1 shows a solid product dispenser 100 including a top housing portion 101 and a bottom housing portion 111 with a support member 102 such as a screen supported between the top housing portion 101 and the bottom housing portion 111. The top housing portion 101 includes a product housing 103 with a cavity 104 in which a first solid product 150 and a second solid product 160 are positioned. The support member 102 supports a bottom portion of the solid product or products being dispensed. A cover 105 may be placed over the cavity 104 to protect the first and second solid products 150 and 160. The bottom housing portion 111 includes a diluent inlet 112 in fluid communication with a spray nozzle 113. A diluent, such as water, is supplied via a conduit (not shown) to the diluent inlet 112 and is then sprayed via the spray nozzle 113 onto a bottom portion 151 of the first solid product 150 through the support member 102. The bottom portion 151 may include a bottom surface and sides of the first solid product 150. A portion of the second solid product 160 may also be sprayed with the diluent to erode a portion of the second solid product 160. The diluent erodes a portion of the first solid product 150, and perhaps a portion of the second solid product 160, to create a use solution, which flows through a cavity 114, through a use solution outlet 115, and through an outlet conduit 116 into a mop bucket (not shown) or any other suitable container.

As the first solid product 150 erodes and becomes smaller, a greater portion of the second solid product 160 will be sprayed with the diluent. Eventually, over a course of several dispensing cycles, the first solid product 150 will be completely dispensed leaving just the second solid product 160 to be dispensed. As the first solid product 150 is eroded and becomes smaller, or as the second solid product 160 is eroded and becomes smaller, a new first solid product 150 may be placed on top of the second solid product 160. Thus, as the solid products are dispensed, alternating products are placed within the product housing 103 to replenish the products.

Figure 2:
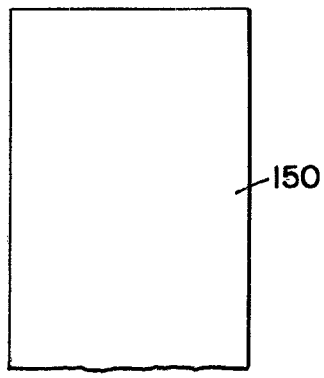
FIG. 2 is a schematic view of the first solid product as it would be positioned in the product housing of the solid product dispenser shown in FIG. 1.
Figure 3:
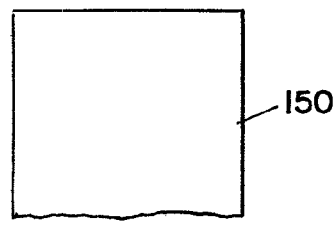
FIG. 3 is a schematic view of the first solid product shown in FIG. 2 partially depleted as it would be positioned in the product housing of the solid product dispenser shown in FIG. 1.
Figure 4:
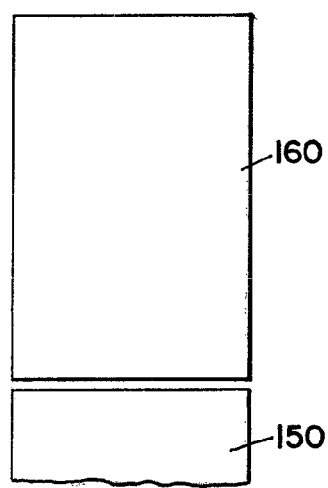
FIG. 4 is a schematic view of the first solid product shown in FIGS. 1 and 2 partially depleted with the second solid product positioned on top of the first solid product as they would be positioned in the product housing of the solid product dispenser shown in FIG. 1.
Figure 5:
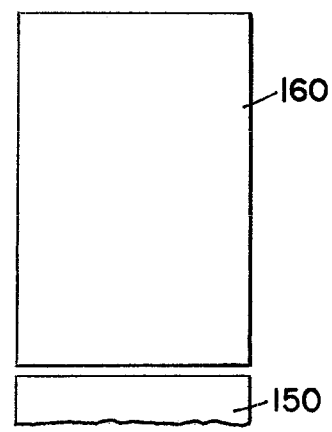
FIG. 5 is a schematic view of the first solid product shown in FIGS. 1 and 2 partially depleted with the second solid product positioned on top of the first solid product as they would be positioned in the product housing of the solid product dispenser shown in FIG. 1.
Figure 6:
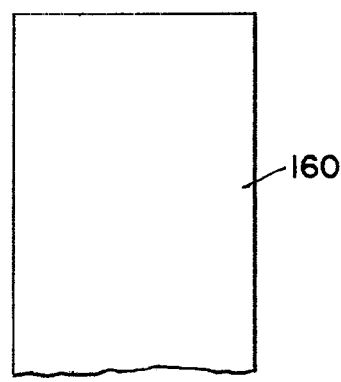
FIG. 6 is a schematic view of the second product shown in FIGS. 4 and 5 after the first product has been completely depleted as it would be positioned in the product housing of the solid product dispenser shown in FIG. 1.

FIGS. 2-6 schematically illustrate how the solid products 150 and 160 are dispensed over several dispensing cycles. FIG. 2 shows the first solid product 150 as it would be positioned in the product housing 103 of the solid product dispenser 100. After several dispensing cycles, the first solid product 150 becomes partially depleted and smaller in size, as shown in FIG. 3. Once the first solid product 150 becomes small enough to allow another product to be placed within the product housing 103, the second solid product 160 may be positioned within the product housing 103 on top of the first solid product 150 as shown in FIGS. 1 and 4. The first solid product 150 continues to become depleted as shown in FIG. 5. As the first solid product 150 becomes more depleted and even smaller, there is a transition from the first solid product 150 to the second solid product 160 where both products will be dispensed. The erosion of the first solid product 150 does not always erode evenly in a straight line across the bottom surface of the product, as shown in the schematic views. The erosion may be uneven, resulting in both solid products 150 and 160 being dispensed substantially concurrently. In addition, the dispenser may spray the diluent onto the sides of the solid products 150 and 160 resulting in both solid products 150 and 160 being dispensed substantially concurrently. Once the first solid product 150 is totally depleted, only the second solid product 160 remains as shown in FIG. 6. Then, as the second solid product 160 is depleted and becomes small enough to allow another product to be placed within the product housing 103, a new first solid product 150 is positioned within the product housing 103 on top of the second solid product 160. This rotation of products continues.

It is recognized that solid products smaller in size may be placed within the product housing so that the first solid product does not have to be partially depleted before the second solid product is placed on top of the first solid product within the product housing. Alternatively, the product housing may be large enough to receive both solid products.

If the first solid product 150 is an acidic cleaning product, then the second solid product 160 is preferably an alkaline cleaning product. During the transition from the first solid product 150 to the second solid product 160, the pH changes from acidic to neutral (while a portion of both solid products 150 and 160 are being eroded and dispensed) to alkaline. If the first solid product 150 is an alkaline cleaning product, then the second solid product 160 is preferably an acidic cleaning product. During the transition from the first solid product 150 to the second solid product 160, the pH changes from alkaline to neutral to acidic.

Although acidic cleaning products and alkaline cleaning products are described herein, it is recognized that other suitable products providing benefits of alternating chemistries may also be used. It is also recognized that more than two products may be rotated within the product dispenser. Any products that could be placed within a product housing of the same dispenser could be used. Preferably, the products would not chemically react with one another. Preferably, the products would dispense at approximately the same rate and utilize the same dispenser settings such as pressure, nozzle height, flow rate, temperature, etc.

Figure 7:
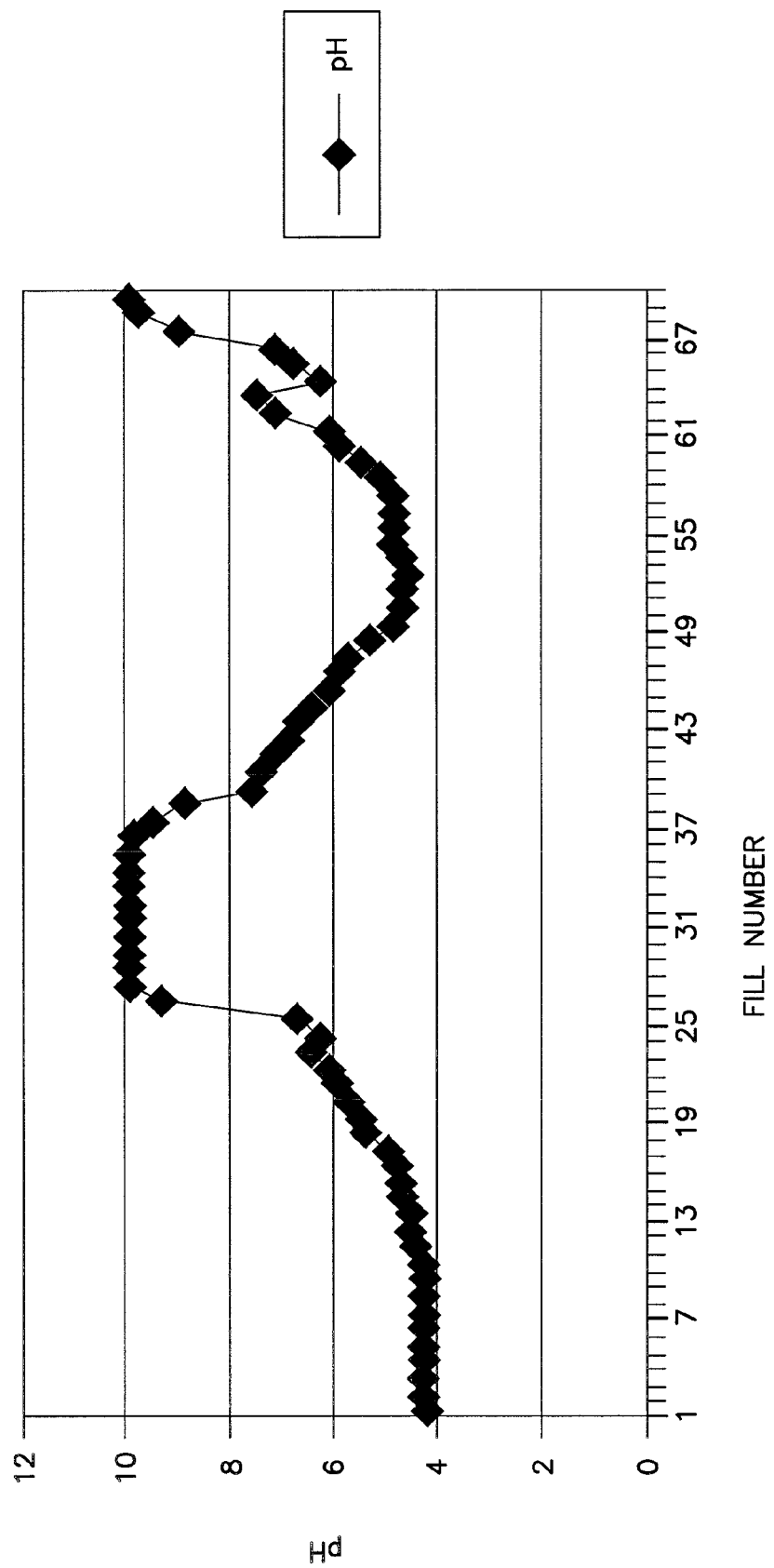
FIG. 7 is a graph showing a pH transition from an acid solid product to an alkaline solid product over several dispensing cycles.

FIG. 7 shows the pH transition from an acidic solid product, to an alkaline solid product, to an acidic solid product, and so on over 70 dispensing cycles, each dispensing cycle being represented by the fill number. Each fill used 4 gallons of water to erode a portion of the product and create a use solution. The acidic solid product was dispensed over the first to the eleventh fills, both the acidic solid product and the alkaline solid product were dispensed over the twelfth to twenty-seventh fills, the alkaline solid product was dispensed over the twenty-eighth to thirty-eighth fills, both the alkaline solid product and the acidic solid product were dispensed over the thirty-ninth to forty-ninth fills, and the cycle begins again. The transition from an acidic pH to an alkaline pH (a pH ranging from 6.00 to 8.00) occurred over approximately 10 fills using a total of approximately 40 gallons of water. It is recognized that smaller or larger solid products may be used and that the numbers of fills over which each solid product is completely dispensed may vary.

This rotation through the ranges of pH (acid to neutral to alkaline to neutral to acid . . . ) delivers improved cleaning results. Preferably, the acidic use solution has a pH of 3.00 to 6.00, the neutral use solution has a pH of 6.00 to 8.00, and the alkaline use solution has a pH of 8.00 to 11.00. Cleaning products having an acidic pH effectively remove polymerized grease soils while cleaning products having an alkaline pH effectively remove fresher grease soils. During the transition from an acidic pH to an alkaline pH, there is a neutral pH, which is effective in removing fresher grease soils although not typically as well as an alkaline pH. Acidic cleaning products remove build-up on floors not effectively removed by alkaline cleaning products and vice versa. Therefore, by alternating these products within a product dispenser, improved cleaning results are delivered.

A preferred acidic cleaning product includes the ingredients listed in Table 1. The weight percentage is the weight of an ingredient based upon the total weight of the composition.

TABLE 1

Acidic Product Ingredients

| Ingredients | Weight Percentage of Product |
|---|---|
| NACCONOL ® 90G (Sodium Dodecylbenzene Sulfonate) | 44.79 |
| Citric Acid | 20.00 |
| Sodium Citrate Dihydrate | 15.00 |
| Urea, Microprilled | 10.00 |
| SURFONIC ® L 12-6 (Ethoxylated Alcohol) | 10.00 |
| Fragrance | 0.20 |
| Dye | 0.01 |
| TOTAL | 100.00 |

It is recognized that any suitable acidic cleaning product may be used. An example of an acidic cleaning product that may be used is disclosed in U.S. Pat. No. 6,432,906, which is incorporated by reference herein. Another example of an acidic cleaning product that may be used is disclosed in U.S. Patent Application Publication No. US 2005/0197276 A1, which is incorporated by reference herein.

A preferred alkaline cleaning product includes the ingredients listed in Table 2. The weight percentage is the weight of an ingredient based upon the total weight of the composition.

TABLE 2

Alkaline Product Ingredients

| Ingredients | Weight Percentage of Product |
| --- | --- |
| NACCONOL ® 90G (Sodium Dodecylbenzene Sulfonate) | 45.67 |
| Dissolvine 220S | 20.00 |
| Sodium Carbonate | 5.00 |
| Sodium Bicarbonate | 5.00 |
| Sodium Metasilicate Pentahydrate | 1.00 |
| Urea | 12.50 |
| Pluronic L62 | 5.00 |
| SURFONIC ® L 12-6 (Ethoxylated Alcohol) | 5.00 |
| Water | 0.62 |
| Fragrance | 0.20 |
| Dye | 0.01 |
| TOTAL | 100.00 |

It is recognized that any suitable alkaline cleaning product may be used. An example of an alkaline cleaning product that may be used is disclosed in U.S. patent application Ser. No. 11/487,599 (titled Alkaline Floor Cleaning Composition and Method of Cleaning a Floor), which is incorporated by reference herein. Another example of an alkaline cleaning product that may be used in disclosed in U.S. Pat. No. 5,474,698, which is incorporated by reference herein.

The acidic solid product disclosed in U.S. Patent Application Publication No. US 2005/0197276 A1 and the alkaline solid product disclosed in U.S. patent application Ser. No. 11/487,599 (titled Alkaline Floor Cleaning Composition and Method of Cleaning a Floor) are the SOLIDSENSE™ Floor Care A & B products by Ecolab Inc. of St. Paul, Minn.

There are many benefits to simply alternating two different solid products within a product housing of a solid product dispenser. One benefit is that only one step is needed to clean the area and as product is dispensed in a use solution, the use solution rotates through a range of pH to effectively clean a range of soils. Another benefit is that only one product dispenser is needed and when the first product level is low, a second product is placed within the product housing. In other words, no product selection is required. This eliminates the need to keep track of which product should be used for each cleaning as the use solution is automatically dispensed by simply alternating the products within the product housing and using the dispenser in its normal course. These benefits are not exhaustive as there are many additional benefits obvious to those skilled in the art.

Example 1

The coefficient of friction (hereinafter "COF") was measured on quarry tile floors proximate a fryer, a grill, a sink, and a lobby at two separate quick service restaurant locations, Location 1 and Location 2. The quarry tile floors were 4 inches by 8 inches American Olean Q01 Canyon Red quarry tiles. The COF was measured using a Brungraber Mark II Slip-Tester with a 3 inches by 3 inches Neolite Sensor according to the Standard Test Method for Using a Portable Inclineable Articulated Strut Slip Tester (PIAST), Designation F 1677-96, under ASTM Standards, ASTM International of West Conshohocken, Pa.

The first measurement, measurement A, was taken after cleaning the floors with an acidic cleaning product, KADET™ Quarry Tile Floor Cleaner by Ecolab Inc. of St. Paul, Minn. Each of the floors was cleaned with a use solution of KADET™ Quarry Tile Floor Cleaner prepared in a mop bucket according to the directions on the product label. The use solution was applied onto the floor with a mop and then brushed or agitated with the mop on the surface of the floor. A squeegee was used to direct the use solution into a floor drain, and then the floor was allowed to dry. The second measurement, measurement B, was taken after cleaning the floors with an alternating acidic cleaning product and an alkaline cleaning product, the SOLIDSENSE™ Floor Care A & B products by Ecolab Inc. of St. Paul, Minn., according to the principles of the present invention. The alternating cleaning products were used over an eight week period and measured at weeks four and eight. Typically, one solid product block was used per week, so the typical cycle would allow for rotation through an acid to alkaline to acid to alkaline use solution before the measurement at week four was taken.

The measurement Dirty/Dry was taken after the breakfast or lunch activity of the quick service restaurants when the quarry tile kitchen floors would be dirty with fresh grease from frying starch or protein food items and some areas could also have polymerized grease. The measurement Dirty/Wet was taken under the same circumstances as Dirty/Dry but wet with water on the floors to simulate a spill. The measurement Clean/Dry was taken after the floors had been cleaned using the typical floor cleaning protocol using either the acidic cleaning product (measurement A) or the alternating acidic cleaning product and the alkaline cleaning product (measurement B) and the floors were allowed to dry. The Clean/Wet measurement was taken under the same circumstances as Clean/Dry but wet with water on the floors to simulate a spill or a still wet after mopping situation.

As shown in FIG. 8, the COF was greater after the floors had been cleaned with the alternating acidic cleaning product and the alkaline cleaning product. Therefore, by alternating the acidic cleaning product and the alkaline cleaning product, the floors had better traction and were less slippery.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of dispensing a first solid product and a second solid product with a solid product dispenser, the first solid product and the second solid product being positioned in a product housing of the solid product dispenser, the first solid product and the second solid product being different products, comprising:
   a) placing the first solid product in the product housing of the solid product dispenser;
   b) placing the second solid product in the product housing of the solid product dispenser on top of the first solid product;
   c) dispensing a portion of the first solid product during at least a first cycle of the solid product dispenser to create a first use solution until the first solid product has been partially depleted to a size small enough to allow the second solid product to also be dispensed;
   d) dispensing a portion of the first solid product and a portion of the second solid product during at least a second cycle of the solid product dispenser to create a second use solution until the first solid product has been completely depleted; and
   e) dispensing a portion of the second solid product during at least a third cycle of the solid product dispenser to create a third use solution, wherein during dispensing a portion of the first solid product, dispensing portions of the first solid product and the second solid product, and dispensing a portion of the second solid product there is a rotation in ranges of pH in the first, second, and third use solutions, wherein the first, second, and third use solutions are cleaning solutions used separately to target different types of soils.

2. The method of claim 1, wherein the first solid product is an acidic cleaning product and the second solid product is an alkaline cleaning product, wherein a use solution having a neutral pH is dispensed during step 1(d).

3. The method of claim 1, wherein the first solid product is an alkaline cleaning product and the second solid product is an acidic cleaning product, wherein a use solution having a neutral pH is dispensed during step 1(d).

4. A method of dispensing a first solid product and a second solid product with a solid product dispenser, the first solid product and the second solid product being positioned in a product housing of the solid product dispenser, the first solid product and the second solid product being different products, comprising:
   a) placing the first solid product in the product housing of the solid product dispenser;
   b) dispensing a portion of the first solid product during at least a first cycle of the solid product dispenser to create a first use solution until the first solid product has been partially depleted to a size small enough to allow the second solid product to be positioned in the product housing on top of the first solid product;
   c) placing the second solid product in the product housing of the solid product dispenser on top of the first solid product;
   d) dispensing a portion of the first solid product during the at least first cycle of the solid product dispenser to create the first use solution until the first solid product has been partially depleted to a size small enough to allow the second solid product to also be dispensed;
   e) dispensing a portion of the first solid product and a portion of the second solid product during at least a second cycle of the solid product dispenser to create a second use solution until the first solid product has been completely depleted; and
   f) dispensing a portion of the second solid product during at least a third cycle of the solid product dispenser to create a third use solution, wherein during dispensing a portion of the first solid product, dispensing portions of the first solid product and the second solid product, and dispensing a portion of the second solid product there is a rotation in ranges of pH in the first, second, and third use solutions, wherein the first, second, and third use solutions are cleaning solutions used separately to target different types of soils.

5. The method of claim 4, wherein the first solid product is an acidic cleaning product and the second solid product is an alkaline cleaning product, wherein a use solution having a neutral pH is dispensed during step 4(e).

6. The method of claim 4, wherein the first solid product is an alkaline cleaning product and the second solid product is an acidic cleaning product, wherein a use solution having a neutral pH is dispensed during step 4(e).

7. A method of dispensing a first solid product and a second solid product with a solid product dispenser, the first solid product and the second solid product being positioned in a product housing of the solid product dispenser, the first solid product and the second solid product being different products, comprising:
   a) placing the first solid product in the product housing;
   b) contacting a bottom portion of the first solid product with a diluent to dissolve a portion of the first solid product to create a first use solution;
   c) dispensing a portion of the first solid product during at least a first cycle of the solid product dispenser until the first solid product has been partially depleted to a size small enough to allow the second solid product to be positioned within the product housing on top of the first solid product;
   d) placing the second solid product in the product housing of the solid product dispenser on top of the first solid product;
   e) contacting a bottom portion of the first solid product with the diluent to dissolve a portion of the first solid product to create the first use solution;
   f) dispensing a portion of the first solid product until the first solid product has been partially depleted to a size small enough to allow the second solid product to also be dispensed;
   g) contacting a bottom portion of the first solid product and a bottom portion of the second solid product with the diluent to dissolve a portion of the first solid product and a portion of the second solid product to create a second use solution;
   h) dispensing a portion of the first solid product and a portion of the second solid product during at least a second cycle until the first solid product has been completely depleted; and
   i) contacting a bottom portion of the second solid product with the diluent during at least a third cycle to dissolve a portion of the second solid product to create a third use solution, wherein during dispensing a portion of the first solid product, dispensing portions of the first solid product and the second solid product, and dispensing a portion of the second solid product there is a rotation in ranges of pH in the first, second, and third use solutions, wherein the first, second, and third use solutions are cleaning solutions used separately to target different types of soils.

8. The method of claim 7, wherein the first use solution has an acidic pH, the second use solution has a neutral pH, and the third use solution has an alkaline pH.

9. The method of claim 7, wherein the first use solution has an alkaline pH, the second use solution has a neutral pH, and the third use solution has an acidic pH.

10. The method of claim 7, wherein the products are sprayed with the diluent.

11. A method of dispensing an acidic solid product and an alkaline solid product with a solid product dispenser, the acidic solid product and the alkaline solid product being positioned alternately in a product housing of the solid product dispenser, comprising:
   a) placing the acidic solid product in the product housing;
   b) contacting a bottom portion of the acidic solid product with a diluent to dissolve a portion of the acidic solid product to create an acidic use solution;
   c) dispensing a portion of the acidic solid product during at least a first cycle of the solid product dispenser until the acidic solid product has been partially depleted to a size small enough to allow the alkaline solid product to be positioned within the product housing on top of the acidic solid product;
   d) placing the alkaline solid product in the product housing of the solid product dispenser on top of the acidic solid product;

e) dispensing a portion of the acidic solid product until the acidic solid product has been partially depleted to a size small enough to allow the alkaline solid product to also be dispensed;
f) contacting a bottom portion of the acidic solid product and a bottom portion of the alkaline solid product with the diluent during at least a second cycle to dissolve a portion of the acidic solid product and a portion of the alkaline solid product to create a neutral use solution;
g) dispensing a portion of the acidic solid product and a portion of the alkaline solid product until the acidic solid product has been completely depleted; and
h) contacting a bottom portion of the alkaline solid product with the diluent during at least a third cycle to dissolve a portion of the alkaline solid product to create an alkaline use solution, wherein there is a rotation in ranges of pH in the acidic use solution, the neutral use solution, and the alkaline use solution, wherein the acidic use solution, the neutral use solution, and the alkaline use solution are used separately to target different types of soils.

12. The method of claim 11, wherein the acidic use solution has a pH from 3.00 to 6.00, the neutral use solution has a pH from 6.00 to 8.00, and the alkaline use solution has a pH from 8.00 to 11.00.

\* \* \* \* \*